United States Patent
Lee (10) Patent No.: US 10,220,767 B2
(45) Date of Patent: Mar. 5, 2019

(54) METHOD OF SHOWING THE INSIDE STATUS OF A VEHICLE VIA A PLURALITY OF FIRST ICONS

(71) Applicant: Thomas Yu Lee, Hillsborough, CA (US)

(72) Inventor: Thomas Yu Lee, Hillsborough, CA (US)

( * ) Notice: Subject to any disclaimer, the term of this patent is extended or adjusted under 35 U.S.C. 154(b) by 0 days.

(21) Appl. No.: 15/600,549

(22) Filed: May 19, 2017

(65) Prior Publication Data

US 2018/0281664 A1 Oct. 4, 2018

(30) Foreign Application Priority Data

Mar. 31, 2017 (TW) .............................. 106111150 A (51) Int. Cl.
*B60J 1/18* (2006.01)
*B60Q 1/26* (2006.01)
*G02B 27/01* (2006.01)

(52) U.S. Cl.
CPC ............... *B60Q 1/268* (2013.01); *B60J 1/18* (2013.01); *G02B 27/01* (2013.01); *B60Q 1/2696* (2013.01); *G02B 2027/0141* (2013.01); *G02B 2027/0196* (2013.01)

(58) Field of Classification Search
CPC .......... B60Q 1/268; B60Q 1/2696; B60J 1/18; G02B 27/01; G02B 2027/0141; G02B 2027/0196
USPC ...................... 116/42, 63 R, 63 P, 63 T, 28 R
See application file for complete search history.

(56) References Cited

U.S. PATENT DOCUMENTS

| 1,896,495 A | * | 2/1933 | O'Donnell | B60Q 1/34 116/42 |
| 4,574,269 A | * | 3/1986 | Miller | B60Q 1/503 340/468 |
| 4,631,516 A | * | 12/1986 | Clinker | B60Q 1/503 340/464 |
| 4,682,146 A | * | 7/1987 | Friedman, III | B60Q 1/302 116/42 |
| 4,860,476 A | * | 8/1989 | Hall | G09F 21/04 40/593 |

(Continued)

FOREIGN PATENT DOCUMENTS

| CN | 203472662 U | 3/2014 |
| CN | 105109345 A | 12/2015 |

(Continued)

*Primary Examiner* — R. A. Smith
*Assistant Examiner* — Tania Courson
(74) *Attorney, Agent, or Firm* — Christensen, Fonder, Dardi & Herbert PLLC (57) ABSTRACT

A method of showing the inside status of a vehicle via a plurality of first icons is provided. The method includes the following steps: (a) disposing a status read device on the vehicle to monitor and report a plurality of operation statuses of the vehicle; (b) transforming the plurality of operation statuses into a plurality of corresponding first icons by an information transform unit; and (c) displaying the plurality of first icons corresponding to the plurality of operation statuses on a first display to show the inside status of the vehicle for the users or drivers outside the vehicle. The first display faces outward and is disposed on the left side, right side or rear side of the vehicle.

8 Claims, 6 Drawing Sheets

(56) References Cited

U.S. PATENT DOCUMENTS

| | | | | |
|---|---|---|---|---|
| 4,868,542 A * | 9/1989 | Thompson | B60Q 1/444 | 340/468 |
| 5,097,612 A * | 3/1992 | Williams | E01F 9/662 | 116/28 R |
| 5,249,381 A * | 10/1993 | Panossian | G09F 21/04 | 116/28 R |
| 5,566,384 A * | 10/1996 | Chien | B60Q 1/30 | 362/276 |
| 5,905,434 A * | 5/1999 | Steffan | B60Q 1/50 | 116/28 R |
| 6,124,783 A * | 9/2000 | Alexander | B60R 25/104 | 340/425.5 |
| 6,178,677 B1 * | 1/2001 | Williams | B60Q 1/503 | 340/902 |
| 6,195,000 B1 * | 2/2001 | Smith | B60Q 1/503 | 340/425.5 |
| 6,300,870 B1 * | 10/2001 | Nelson | B60Q 1/503 | 340/463 |
| 6,401,374 B1 * | 6/2002 | Bahmad | B60Q 1/503 | 40/564 |
| 6,446,375 B1 * | 9/2002 | Davis | G09F 3/20 | 40/591 |
| 6,553,285 B1 * | 4/2003 | Bahmad | B60Q 1/503 | 116/42 |
| 6,789,339 B2 * | 9/2004 | Blease | G09F 21/04 | 362/503 |
| 7,095,318 B1 * | 8/2006 | Bekhor | B60Q 1/26 | 340/464 |
| 7,142,104 B1 * | 11/2006 | Blueford | B60Q 1/503 | 340/426.13 |
| 7,780,322 B2 | 8/2010 | Muller et al. | | |
| 9,688,287 B2 * | 6/2017 | Seder | B60C 9/00 | |
| 10,068,377 B2 * | 9/2018 | Sisbot | G06T 19/006 | |
| 2002/0063686 A1 * | 5/2002 | Schaum | G09F 13/04 | 345/156 |
| 2007/0217213 A1 * | 9/2007 | Chang | B60Q 1/268 | 362/503 |
| 2012/0222340 A1 * | 9/2012 | Paquette | G09F 7/18 | 40/541 |
| 2015/0375673 A1 * | 12/2015 | Testai | B60Q 1/268 | 362/545 |
| 2016/0082979 A1 * | 3/2016 | Seder | B60C 9/00 | 340/933 |
| 2016/0104417 A1 | 4/2016 | Gahagan | | |
| 2016/0109701 A1 * | 4/2016 | Goldman-Shenhar | G02B 27/01 | 345/8 |
| 2017/0208668 A1 * | 7/2017 | Kramer | H05B 37/0272 | |

FOREIGN PATENT DOCUMENTS

| | | |
|---|---|---|
| DE | 10 2004 018 647 A1 | 3/2005 |
| DE | 10 2011 114 959 A1 | 4/2012 |

\* cited by examiner

– METHOD OF SHOWING THE INSIDE STATUS OF A VEHICLE VIA A PLURALITY OF FIRST ICONS –

This application claims priority to Taiwan Patent Application No. 106111150 filed on Mar. 31, 2017, which is hereby incorporated by reference in its entirety.

CROSS-REFERENCES TO RELATED APPLICATIONS

Not applicable.

BACKGROUND OF THE INVENTION

Field of the Invention

The present invention relates to a method of showing the inside status of a vehicle, and more particularly, to a method of displaying the inside status of a vehicle on a first display via a plurality of first icons.

Descriptions of the Related Art

For conventional vehicles such as the common sedans, it is possible for people outside the vehicles to see the inside status of the vehicle through the window glass of the vehicle provided that no heat-insulation film is attached on the windows and the vehicle is stationary. However, once the vehicle starts to move, it becomes difficult for people outside the vehicle to observe the inside status of the vehicle.

Therefore, in cases where a pet, a baby or an elder is in the vehicle or the driver of the vehicle is a green-hand driver, the driver can only attach a label on the rear side of the vehicle to prompt others. However, this has the shortcomings that the label is difficult to be detached and information cannot be updated in real time.

On the other hand, if the vehicle user desires to show special information such as "the vehicle is driving at a constant speed" or "the driver is not familiar with the road and is finding the way", it will be more difficult to use a label to show such a desire in real time.

Installing an LED marquee on the rear side of the vehicle also helps to achieve the purpose of real-time showing, but there is a concern that installation of the LED marquee might violate the law for safety reasons if the additionally installed LED marquee is so bright to affect the sight of drivers of vehicles following this vehicle.

Accordingly, an urgent need exists in the art to provide a method of showing the inside status of a vehicle in a quick and simple way so that people outside the vehicle can know the inside status of the vehicle in real time and then keep a safe distance from the vehicle to improve the driving safety.

SUMMARY OF THE INVENTION

An objective of the present invention is to provide a method of showing the inside status of a vehicle in real time via a plurality of first icons so that people outside the vehicle is prompted to keep a safe distance from the vehicle to promote the driving safety.

To achieve the aforesaid objective, the method of showing the inside status of a vehicle via a plurality of first icons comprises the following steps: (a) disposing a status read device on the vehicle to monitor and report a plurality of operation statuses of the vehicle; (b) transforming the plurality of operation statuses into the plurality of corresponding first icons by an information transform unit; and (c) displaying the plurality of first icons corresponding to the plurality of operation statuses on a first display to show the inside status of the vehicle for a user outside the vehicle. The first display faces outward and is disposed on the left side, the right side or the rear side of the vehicle.

To achieve the aforesaid objective, the method of the present invention further comprises the following step: (d) transforming information except for the operation statuses into a plurality of corresponding second icons via the information transform unit through a manual operation, and displaying the plurality of second icons on the first display.

To achieve the aforesaid objective, the manual operation in the method of the present invention comprises execution of an application of a mobile device.

To achieve the aforesaid objective, the status read device, the first display and the mobile device in the method of the present invention exchange signals with the information transform unit in a wired or wireless way.

To achieve the aforesaid objective, the plurality of first icons and the plurality of second icons in the method of the present invention are pure icons containing no text.

To achieve the aforesaid objective, the plurality of first icons and the plurality of second icons in the method of the present invention are presented in a fluorescent color system.

To achieve the aforesaid objective, the status read device in the method of the present invention is an on-board diagnostics (OBD) system, and the information transform unit is a central processing unit (CPU).

To achieve the aforesaid objective, the method of the present invention further comprises the following step: disposing at least one second display on the vehicle, wherein the at least one second display exchanges signals with the information transform unit in a wired or wireless way and is disposed at a position different from that of the first display.

To achieve the aforesaid objective, each of the first display and the at least one second display in the method of the present invention is a flat display or a curved-surface display.

To achieve the aforesaid objective, the information transform unit in the method of the present invention is disposed on a trunk of the vehicle.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
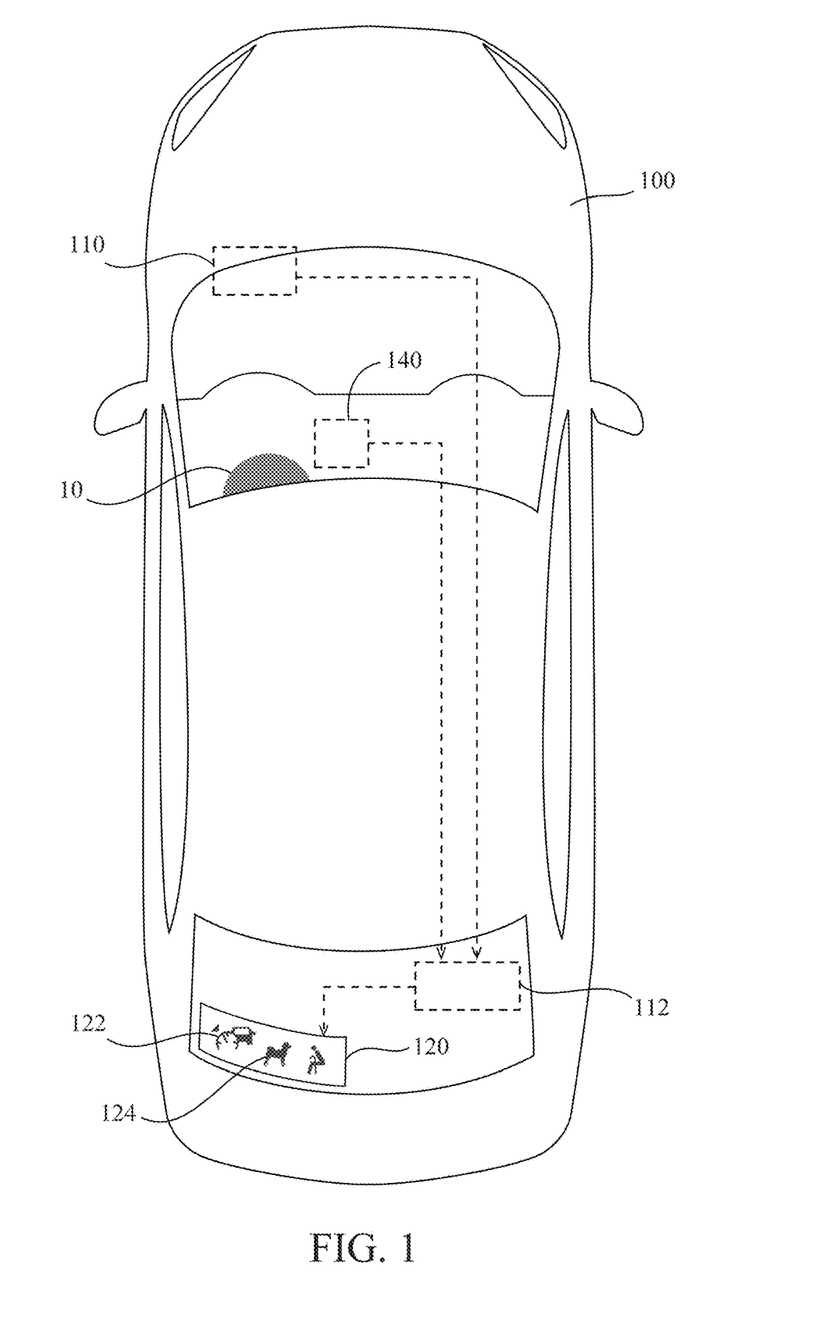
FIG. 1 is a schematic view illustrating a usage status in which the method of showing the inside status of a vehicle according to the present invention is applied to the vehicle.
Figure 2:
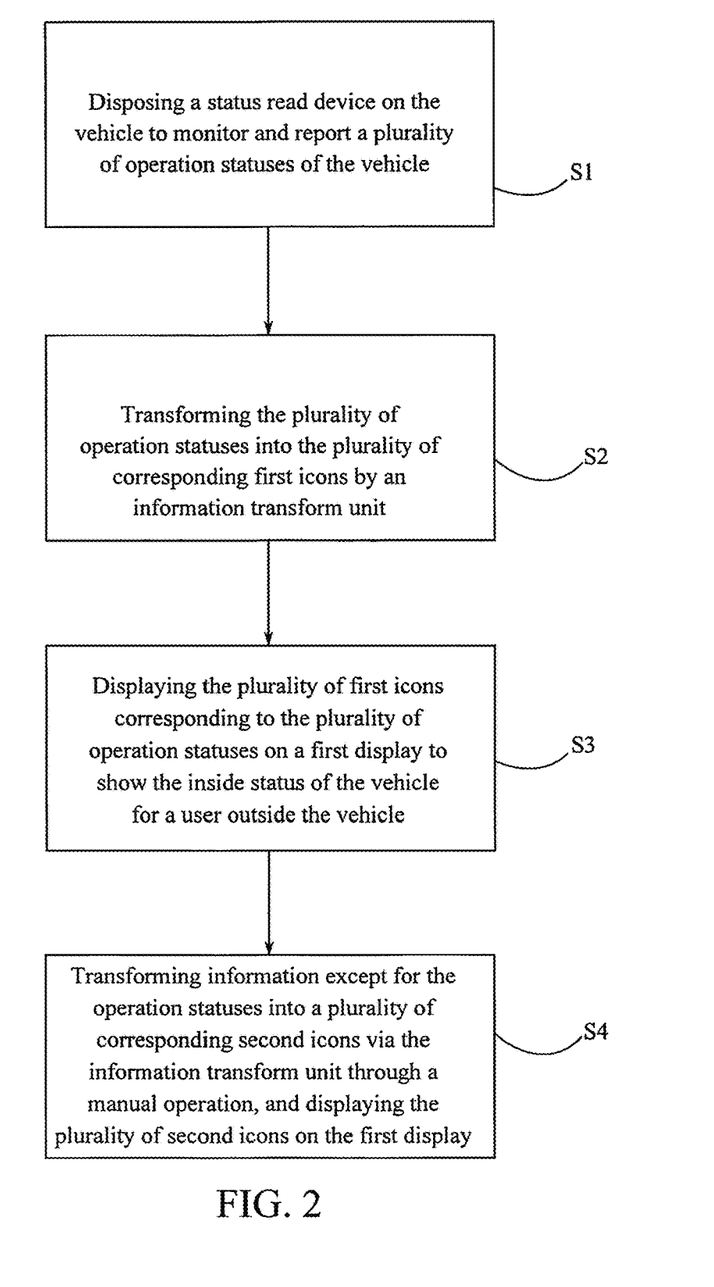
FIG. 2 is flowchart diagram of the method of showing the inside status of a vehicle according to the present invention.

As shown in FIG. 1, the present invention relates to a method of showing the inside status of a vehicle 100 via a plurality of first icons 122. The method may comprise the following steps as shown in FIG. 2.

Please refer to FIG. 1 together. As shown in the step S1, a status read device 110 is disposed on the vehicle 100 to monitor and report a plurality of operation statuses of the vehicle 100. Here, the operation statuses may be, for example, the vehicle speed, the status of driving at a constant speed, the engine status, the oil level or the like information. Then as shown in the step S2, the plurality of operation statuses is transformed into the plurality of corresponding first icons 122 by an information transform unit 112. Finally, as shown in the step S3, the plurality of first icons 122 corresponding to the plurality of operation statuses is displayed on a first display 120 to show the inside status of the vehicle 100 so that a user outside the vehicle 100 or passerbys can know the corresponding information from the first display 120.

Figure 3:
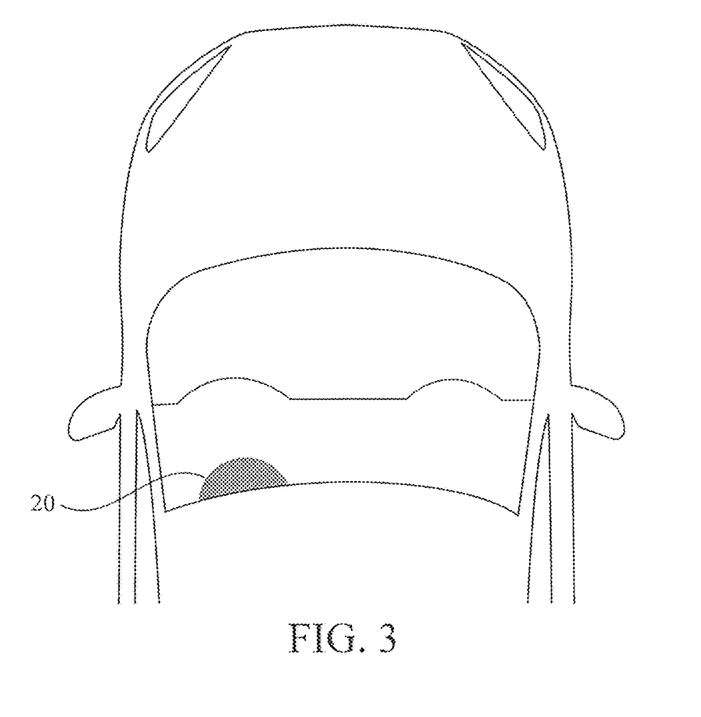
FIG. 3 is a schematic view illustrating how a user at the rear side of the vehicle recognizes the inside status of the vehicle when the vehicle is in use as shown in FIG. 1.

Then as shown in FIG. 3, once the first icons 122 corresponding to such statuses as the vehicle speed and the status of driving at a constant speed on the first display 120 disposed on the rear side of the vehicle 100, a user 20 of a vehicle following the vehicle 100 can know the driving status of the vehicle 100 so as to avoid accidents by keeping an appropriate distance therefrom.

Figure 4A:
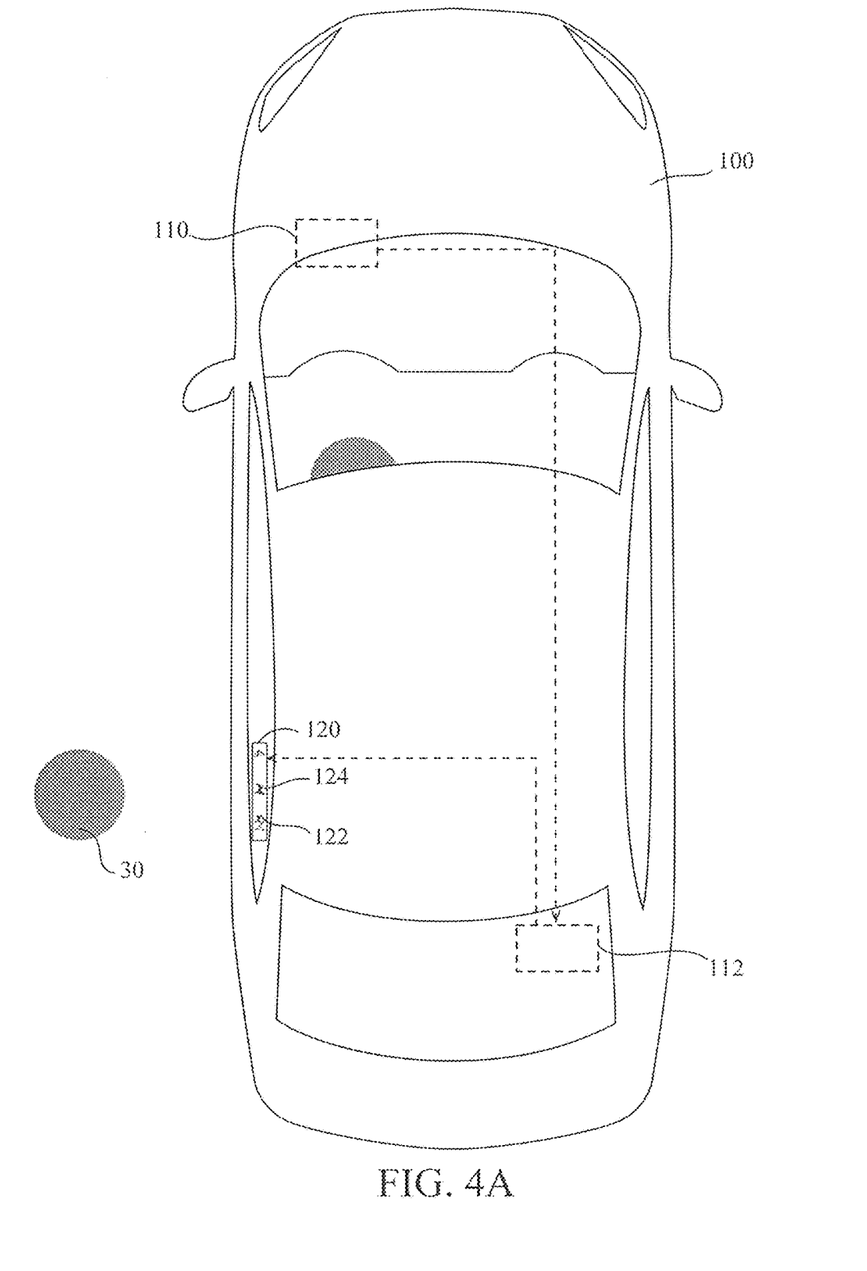
FIG. 4A is a schematic view illustrating a case where a first display of the method according to the present invention is disposed on a left side of the vehicle.
Figure 4B:
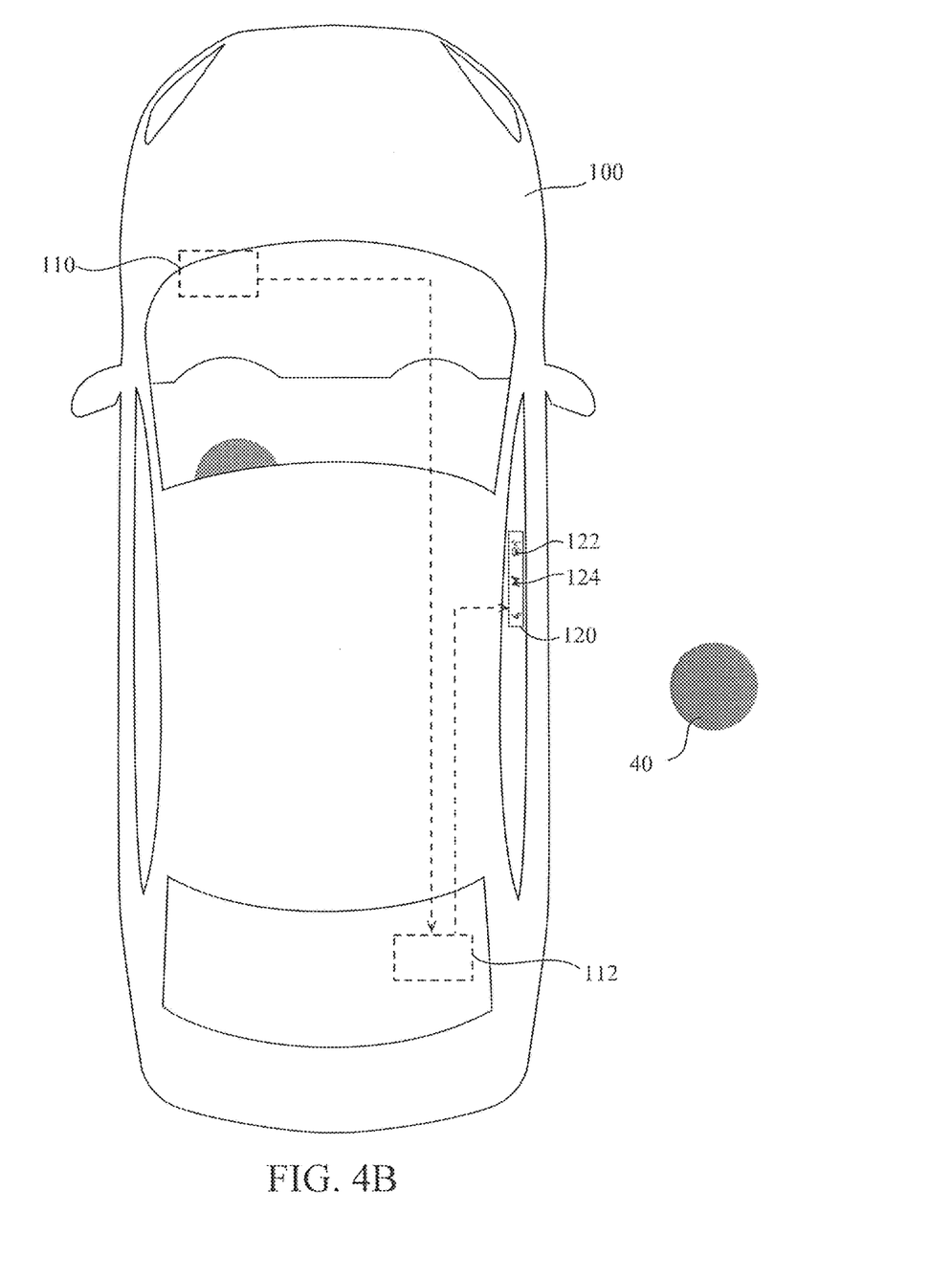
FIG. 4B is a schematic view illustrating a case where the first display of the method according to the present invention is disposed on a right side of the vehicle.

In addition to being disposed on the rear side of the vehicle 100 as shown in FIG. 3, the first display 120 may also be disposed on the left side or the right side of the vehicle 100 to face outward as shown in FIG. 4A or FIG. 4B so that the information displayed can be seen by a user 30/40 at the left side/right side of the vehicle 100 for alerting purpose.

Please refer back to FIG. 2. The method of the present invention may further comprise a step S4: transforming information (e.g., an elder, a baby or a pet being in the vehicle, or the driver being a green-hand driver) except for the aforesaid operation statuses into a plurality of corresponding second icons 124 via the information transform unit 112 through a manual operation, and displaying the plurality of second icons 124 on the first display 120.

The manual operation described above comprises execution of an application (APP) of a mobile device 140 (see FIG. 1), but is not limited to this. That is, in addition to the application installed on a mobile device 140 (e.g., a mobile phone or a tablet computer), an application installed on a desktop computer or a navigation device may be used.

In detail, signal transmissions between the status read device 110 and the information transform unit 112 and between the mobile device 140 and the information transform unit 112 in the present invention may be implemented in a wired or wireless (e.g., NFC or Bluetooth) way, so the transmission mode may vary depending on configurations of various vehicle models or the user's preferences.

In the present invention, the status read device 110 comprises an on-board diagnostics (OBD) system, and the information transform unit 112 is a central processing unit (CPU). The status read device 110 (OBD) can obtain operation statuses of the mobile device 140 all around and transmit information of the operation statuses to the information transform unit 112 (CPU). The information of the operation statuses is transformed by the information transform unit 112 (CPU) into a plurality of first icons 122 and then the first icons 122 are displayed on the first display 120. For example, as shown in FIG. 3, if the OBD detects that the vehicle 100 is set to drive at a constant speed, then through transformation by the information transform unit 112 (CPU), an icon corresponding to driving at a constant speed is selected from the first icons 122 and displayed on the first display 120.

In the present invention, in addition to operating an application to select a plurality of second icons 124 corresponding to the inside statuses of the vehicle 100 and display them on the first display 120, the user 10 may also connect to a cloud database via the application to download different icons for replacing the first icons 122 or the second icons 124. This can add to the fun in use of the present invention. Moreover, the user 10 may further manage and summarize the operation statuses of the vehicle 100 via the application to track health conditions of the vehicle.

Besides, as shown in FIG. 3 and FIGS. 4A-4B, the first icons 122 and the second icons 124 displayed on the first display 120 in the method of the present invention are pure icons containing no text. Because this can eliminate the need of time to read texts, the inside status of the vehicle 100 can be quickly learned by the user 20/30/40 outside the vehicle 100 and a neat appearance of the vehicle can be kept. Meanwhile, the first icons 122 and the second icons 124 are preferably presented in a fluorescent color system for purpose of highlighting, but they are not limited to this.

In the method of the present invention, at least one second display 130 may also be disposed on the vehicle 100 depending on different needs so as to improve the displaying effect. Because the disposition and the type of the at least one second display 130 are similar to those of the first display 120, technical contents of the at least one second display 130 that are identical to the first display 120 will not be further described herein.

In detail, the at least one second display 130 differs from the first display 120 mainly in the position where it is disposed. That is, the second display 130 is disposed at a position different from that of the first display 120.

Figure 5:
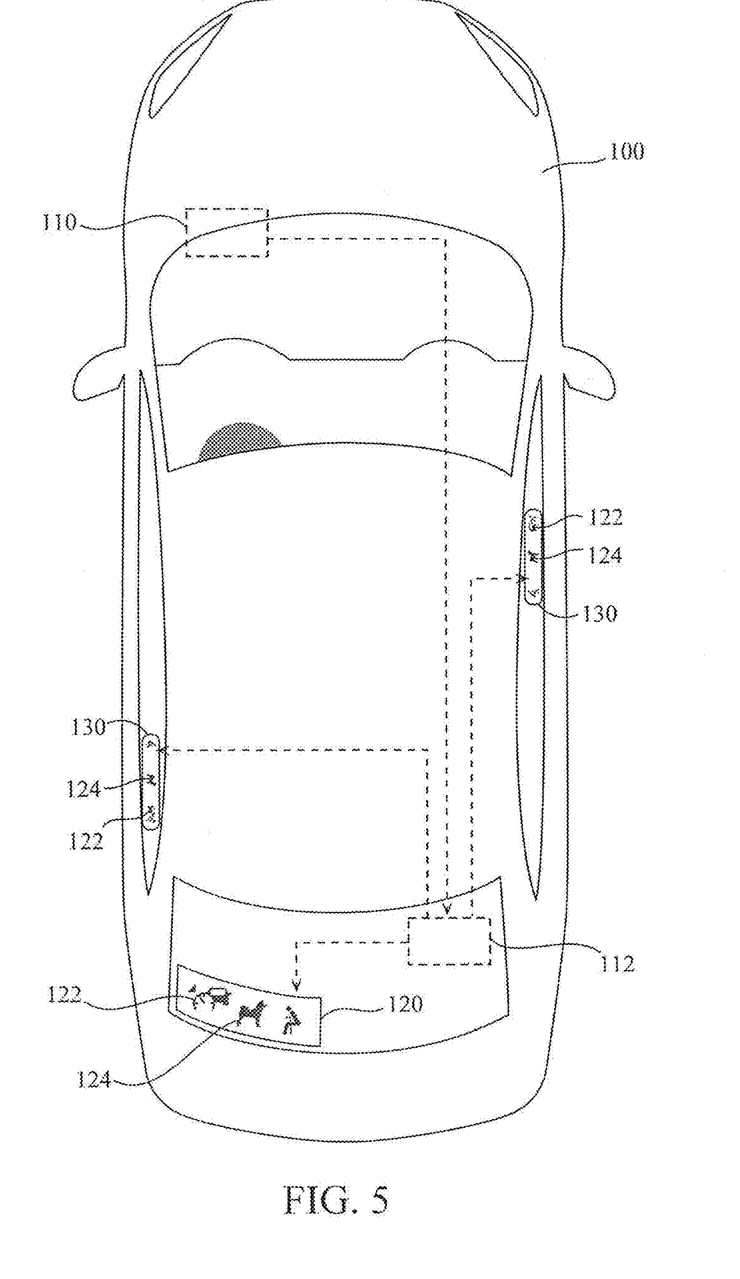
FIG. 5 is a schematic view illustrating a case where the first display is disposed on the rear side of the vehicle and two second displays are disposed on the left side and the right side of the vehicle respectively in the method according to the present invention.

For example, as shown in FIG. 5, when the first display 120 is disposed on the rear side of the vehicle 100, two second displays 130 may be further disposed on the rear left side and the front right side of the vehicle 100 respectively so that information about the inside status of the vehicle 100 can also be seen by users 30/40 located to the left and to the right of the vehicle 100 to enhance the showing/alerting effect. Of course, the disposition manner and the number of the at least one second display 130 may vary depending on the user's need.

Each of the first display 120 and the at least one second display 130 may be optionally a flat display or a curved-surface display depending on different needs, and is preferably an organic light emitting diode (OLED) display so that a clear image related to information of the inside status can be provided to the users 20/30/40 outside the vehicle 100 and brightness can be flexibly adjusted to not affect the sight of drivers following this vehicle, thus improving the driving safety. Also, the first display 120 and the at least one second display 130 may exchange signals with the information transform unit 112 in a wired or wireless way to improve the flexibility in disposition.

With the aforesaid arrangements, the method of showing the inside status of a vehicle via a plurality of first icons according to the present invention can display a plurality of icons on a display so that users outside the vehicle can be informed of the inside status of the vehicle to keep a safe distance therefrom, and moreover, the user inside the vehicle can update a plurality of icons via an application to add to the fun or manage a plurality of pieces of operation status information to track the health conditions of the vehicle to effectively improve the driving safety.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method of showing the inside status of a vehicle via a plurality of icons, comprising the following steps:
    disposing a status read device on the vehicle to monitor and report a plurality of operation statuses of the vehicle;
    transforming the plurality of operation statuses into a plurality of corresponding first icons via an information transform unit, the plurality of first icons being pure icons containing no text;
    displaying at least one of the plurality of first icons corresponding to the plurality of operation statuses on a first display such that a status of the vehicle operation is communicable to a user outside the vehicle;
    transforming information relating to persons or contents in the vehicle into a plurality of corresponding second icons via the information transform unit, the plurality of second icons being pure icons containing no text; and
    displaying at least one of the plurality of second icons corresponding to the information relating to persons or contents in the vehicle on the first display such that a status of person or contents in the vehicle is communicable to a user outside the vehicle;
    wherein the first display faces outward and is disposed on the left side, the right side or the rear side of the vehicle;
    wherein the status read device comprises an on-board diagnostic (OBD) system, and the information transform unit comprises a central processing unit (CPU).

2. The method of claim 1, wherein the information relating to person or contents in the vehicle is communicated to the information transform unit via a manual operation.

3. The method of claim 2, wherein the manual operation comprises execution of an application of a mobile device.

4. The method of claim 3, wherein the status read device, the first display and the mobile device exchange signals with the information transform unit in a wired or wireless way.

5. The method of claim 1, wherein the plurality of first icons and the plurality of second icons are presented in a fluorescent color system.

6. The method of claim 1, further comprising the following step:
    disposing at least one second display on the vehicle, wherein the at least one second display exchanges signals with the information transform unit in a wired or wireless way and is disposed at a position different from that of the first display.

7. The method of claim 6, wherein each of the first display and the at least one second display comprises a flat display or a curved-surface display.

8. The method of claim 1, wherein the information transform unit is disposed on a trunk of the vehicle.

* * * * *